United States Patent
Tattermusch et al.

[11] Patent Number: 5,501,432
[45] Date of Patent: Mar. 26, 1996

[54] MOTOR VEHICLE AIR SPRING

[75] Inventors: Peter Tattermusch; Thomas Huch, both of Esslingen, Germany

[73] Assignee: Mercedes-Benz AG, Germany

[21] Appl. No.: 400,253

[22] Filed: Mar. 8, 1995

[30] Foreign Application Priority Data

Mar. 8, 1994 [DE] Germany ............. 44 07 740.8

[51] Int. Cl.⁶ ................................ F16F 5/00
[52] U.S. Cl. ................. 267/64.24; 267/64.27
[58] Field of Search ............... 188/298, 312, 188/321.11, 322.11; 267/64.19, 64.21, 64.23, 64.24, 64.26, 118, 119, 122, 124, 130, 136, 256, 257; 280/663, 672, 683, 693, 702, 698

[56] References Cited

U.S. PATENT DOCUMENTS

| | | | |
|---|---|---|---|
| 2,882,042 | 4/1959 | Flekenstein | 267/64.24 |
| 2,901,242 | 8/1959 | Elliott et al. | 267/64.24 |
| 2,960,333 | 11/1960 | McGavern et al. | 267/64.24 |
| 3,033,558 | 5/1962 | Selmmons et al. | 267/64.24 |
| 3,627,298 | 12/1971 | Gaydecki | 267/64.24 |
| 4,493,481 | 1/1985 | Merkle | 267/64.27 |
| 4,749,152 | 6/1988 | Veaux et al. | 188/321.11 |
| 5,366,048 | 11/1994 | Watanabe et al. | 267/64.24 |

FOREIGN PATENT DOCUMENTS

| | | | |
|---|---|---|---|
| 2672354 | 1/1991 | France. | |
| 3934821A1 | 4/1991 | Germany. | |
| 0141243 | 6/1989 | Japan | 267/64.27 |
| 831222 | 3/1960 | United Kingdom. | |
| 2177866 | 1/1987 | United Kingdom. | |

*Primary Examiner*—Robert J. Oberleitner
*Assistant Examiner*—Chris Schwartz
*Attorney, Agent, or Firm*—Evenson, McKeown, Edwards & Lenahan

[57] ABSTRACT

A motor vehicle air spring is arranged between the vehicle body and a link. The spring comprises a housing and piston configured as a double-ring body with inner rings and outer rings defining an annular space for U-shaped bellows. The piston is connected to the link by a joint rod.

4 Claims, 1 Drawing Sheet

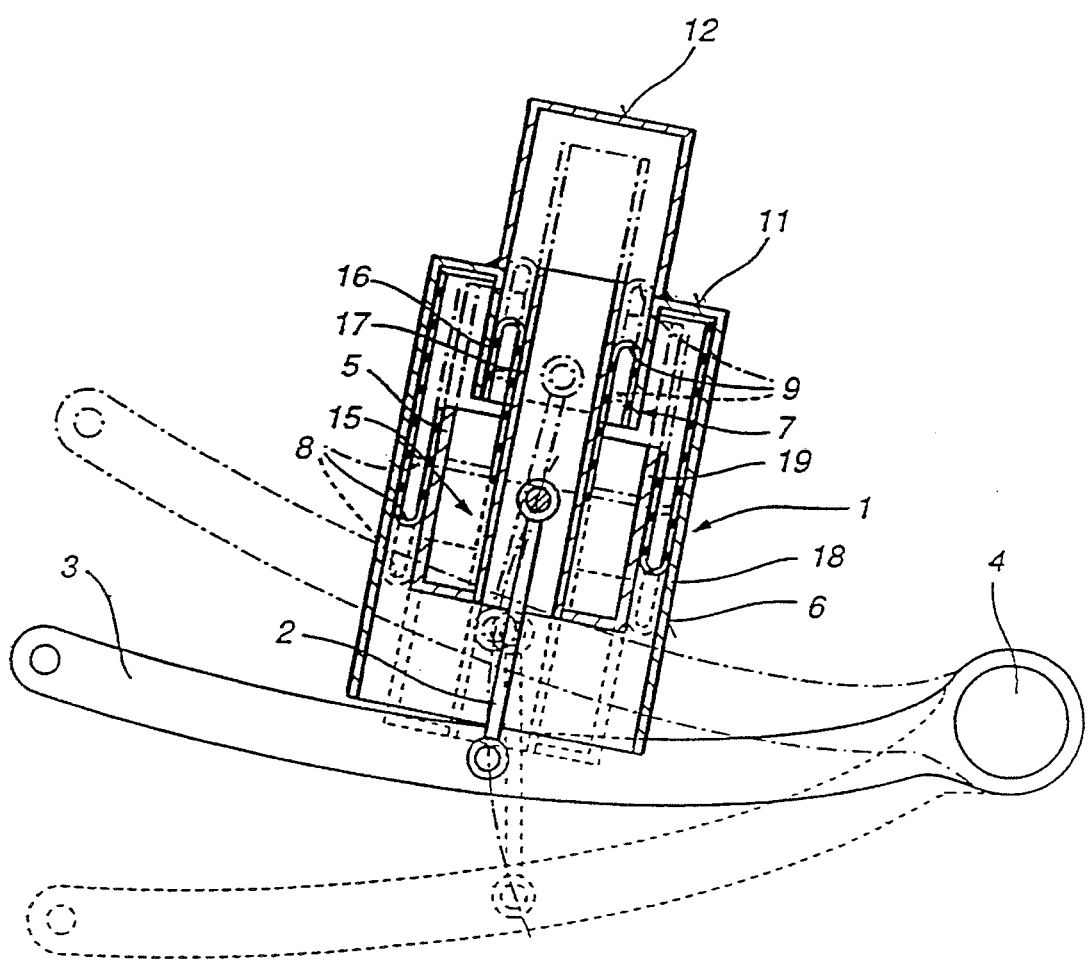

MOTOR VEHICLE AIR SPRING

BACKGROUND AND SUMMARY OF THE INVENTION

The present invention relates to an air spring for motor vehicles, and more particularly, to an air spring comprising a housing and a piston surrounded by the housing. The housing and the piston are configured to form guide surfaces for U-type bellows operatively arranged therebetween and acting in opposite directions. Each of the U-type bellows is arranged between a radially outer circumferential wall of the piston and a radially inner circumferential wall of the housing.

For the suspension of vehicle axles, two possible arrangements are generally known. Either the spring and the damper are arranged separately on a link, or the spring and the damper are arranged concentrically, i.e. as a spring/damper element, and are attached to a link.

In the first known arrangement when the spring and the damper are separate from each other, the spring element carries out every movement of the link on which it is arranged. Thus, the spring element is sometimes so greatly compressed that it bends out due to the compression forces acting at its ends. This bending-out, which also occurs in the bellows of an air suspension in the arrangement on the link, enforces the use of rigid bellows which dampen the extent of the bending-out.

In the concentric arrangement of the spring and the damper on a link, it is possible, with straight guiding of the air spring element, to use thinner bellows. As a result of this arrangement, however, disadvantages have to be tolerated with respect to the spatial arrangement of the vehicle which results, for example, in a loss of trunk space or higher production costs due to the relatively large space requirement of the spring/damper arrangement.

An air spring element described in U.S. Pat. No. 3,033,558 consists of a single piston and does not have the above-mentioned disadvantages of the two above-discussed known different arrangements. In this air spring element, however, a compensation chamber is also required, into which the volume of air enclosed in the spring element and squeezed during the deflection operation can escape. By the provision of an additional compensation chamber, both the production costs and the expenditure for assembly of the air spring element are increased considerably.

An air spring for motor vehicles is described in U.S. Pat. No. 4,493,481. This air spring has a closed spring volume and two active spring surfaces of different sizes which are pressurized in opposite directions, face away from each other, and are variable in their size depending on the spring path. The spring surfaces are supported coaxially against each other. The spring volume is formed by two U-type bellows which bound a common chamber and whose active surfaces facing away from each other are supported on rigidly interconnected spring pistons of different diameters. Thus, the deformations of the loops of the U-type bellows during spring movements result in changes in volume which approximately balance each other out. The spring force is transmitted, on one hand, by the spring piston and, on the other hand, by a casing assigned to the walls of the U-type bellows.

It is disadvantageous in the known air spring to have a tension rod which is passed through the closed spring volume. As a result, complex and expensive sealing devices are required between the tension rod and the closed spring volume in order in fact to keep the latter closed.

An object of the present invention is, therefore, to overcome the above-mentioned disadvantages of known arrangements and, in particular to provide in a cost-effective manner an air spring for motor vehicles which combines the advantages of the separate spring and damper arrangement.

This object has been achieved in accordance with the present invention by providing that the housing and the piston comprise a double ring body each having an inner ring and an outer ring connected by an annular collar. One ring body is located opposite the other in mirror image and engages axially over the other in a region of the U-type bellows such that the outer rings and the inner rings define an annular space to receive the U-type bellows.

By configuring the housing and the piston in each case as a double ring body with an inner ring and an outer ring connected by an annular collar in accordance with the present invention, the above-mentioned disadvantages of the separate spring/damper arrangement and of the concentric spring/damper arrangement can be avoided in a desirably simple manner because bending-out is prevented. The overall arrangement is constructed in a space-saving manner so that no disadvantages have to be tolerated in respect of the spatial criteria of the vehicle.

Additionally, the configuration of the air spring according to the present invention results in a compact construction which accommodates the air spring below the vehicle.

A further advantage of the present invention resulting from the arrangement of the U-type bellows to form a parallel guide of the piston inside the housing resides in the articulated link arrangement only having to be called upon in the case of relatively large deviations in the tilt angle.

By way of the connection of the air spring according to the present invention to the link by a piston rod which has a joint at each of its ends, a connection between the link and the air spring can be produced very rapidly and cost-effectively.

BRIEF DESCRIPTION OF THE DRAWING

These and other objects, features and advantages of the present invention will become more readily apparent from the following detailed description thereof when taken in conjunction with the accompanying sole FIGURE which is a partial cross-sectional view of the air spring and associated link according to the present invention.

DETAILED DESCRIPTION OF THE DRAWING

An air spring designated generally by numeral 1 is connected to a link 3 via a piston rod 2 having a joint at each of its ends. The link 3 can turn about a bearing point 4 for inward and outward deflection in a known manner. In addition to the basic position, an inwardly deflected and an outwardly deflected position of the link 3 and all the elements of the air spring 1 connected thereto are also illustrated by dashed lines, such that the kinematics of the air spring can be seen clearly.

The air spring 1 has a piston 15 which is guided in a housing 6 of the spring element 1. The housing 6 and the piston 15 are each configured as a double ring body 5, 7. The respective inner rings 16, 17 of the double ring 5, 7 are connected to each other, and likewise the outer rings 18, 19 are connected to each other. In other words, for example, the inner ring 16 of the housing 6 is connected to the inner ring 17 of the piston 15.

The guiding and connection of the double ring bodies 5, 7 inside the housing 6 of the air spring 1 are effected by U-type bellows 8, 9 which are each arranged in annular spaces formed by the double ring bodies 5, 7 inside the housing 6. Because of the internal pressure of equal size at all points prevailing in the air spring 1 in an enclosed space bounded by the U-type bellows 8, 9, the housing 6 and the piston 15, the double ring bodies 5, 7 are guided centrally in the housing 6. The U-type bellows 8, 9 are arranged between a radially outer circumferential wall of the piston 15 and a radially inner circumferential wall of the housing 6.

The double ring bodies 5, 7 are provided concentrically in the housing 6, and are located opposite each other in mirror image so as to engage over each other axially in the region of the U-type bellows 8, 9. On the side of the air spring 1 facing away from the link 3, a cover 12 is mounted on the housing 6 to prevent dirt or foreign bodies entering the housing 6 and thus also prevent any possible damage to or impairment of the function of the U-type bellows 8, 9.

During a movement of the link 3, its turning movement is transmitted via the piston rod 2 to the piston 15. The piston 15 is closed at its lower end face adjacent the link 3. The inner ring 17 of the piston 15 can move outwards, during inward deflection of the link 3, as shown by the dot-dash lines in the FIGURE, through a circular opening in the upper region, or the region facing away from the link 3, of the housing 6. The opening forms the inner surface of the inner ring 16 of the housing 6.

During an outward deflection of the link 3, that is during a downward movement of the link 3 as shown by dotted lines in the FIGURE, the piston 15 disappears even further in the housing 6 of the air spring 1.

The articulated connection of the piston rod 2 at both its ends to the air spring 1, i.e. to the piston 15 or the link 3, guarantees that the piston 15 cannot be displaced inside the housing 6 at a right angle to the longitudinal axis of the housing 6 and thus cannot impair the function of the air spring 1 or even destroy or damage it. Consequently, even undesirable longitudinal displacements of the piston 15 are prevented such that a disconnection of the body of the vehicle from the movements of the link 3 is effected since the link 3 and the housing 6 of the air spring 1 which is attached to the body of the vehicle, are not connected to each other by mechanical components such as, for example, a helical spring. The connection is effected only by the U-type bellows 8, 9, the space bounded by the U-type bellows 8, 9 and the ring bodies 5, 7, in which, as previously mentioned, a constant pressure always prevails since the space is closed or sealed off relative to the atmosphere.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An air spring for a motor vehicle, comprising a housing, a piston surrounded by the housing, and U-shaped bellows, the housing and the piston being configured to form guide surfaces for the U-shaped bellows operatively arranged therebetween and acting in opposite directions, each of the U-shaped bellows is arranged between a radially outer circumferential wall of the piston and a radially inner circumferential wall of the housing, wherein the housing and the piston comprise axially engaging double ring bodies having a connected inner ring and an outer ring located opposite each other in mirror image and arranged in a region of the U-shaped bellows such that the outer rings and the inner rings define an annular space to receive the U-shaped bellows.

2. The air spring according to claim 1, wherein a piston rod articulatably connects the piston to a link of the motor vehicle.

3. The air spring according to claim 1, wherein the piston protrudes outwards through an opening in the housing.

4. The air spring according to claim 3, wherein a piston rod articulatably connects the piston to a link of the motor vehicle.

\* \* \* \* \*